Patented July 21, 1936

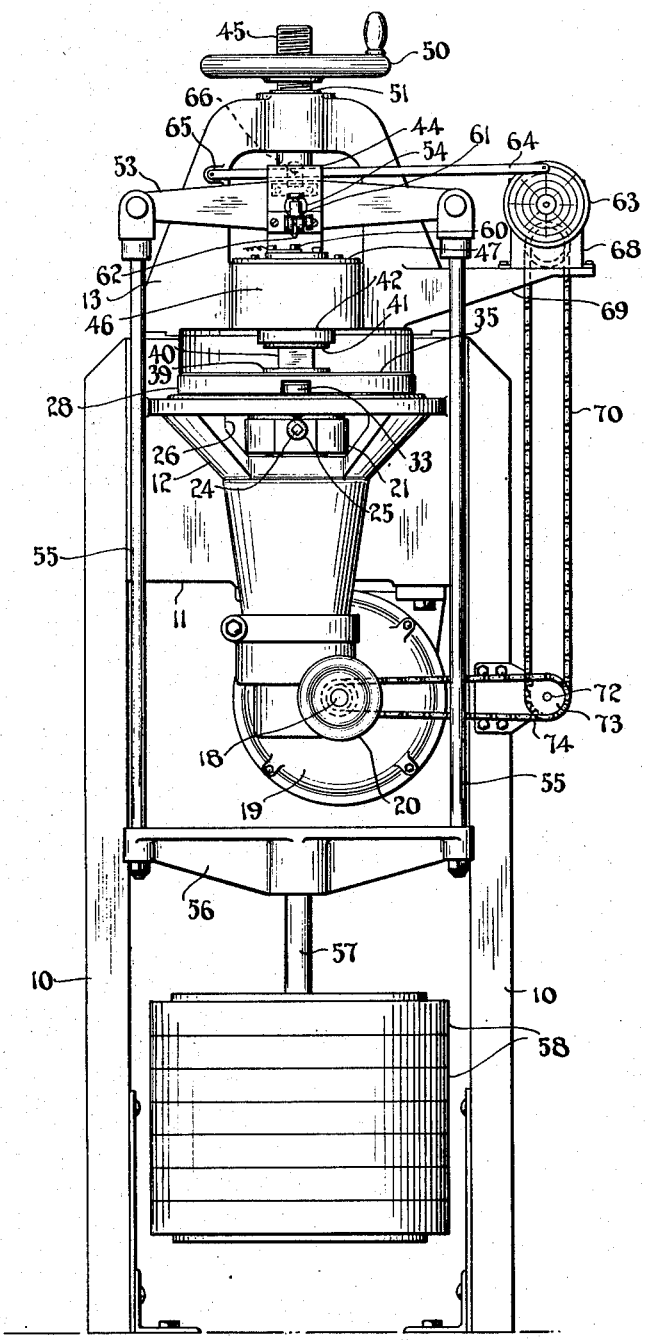

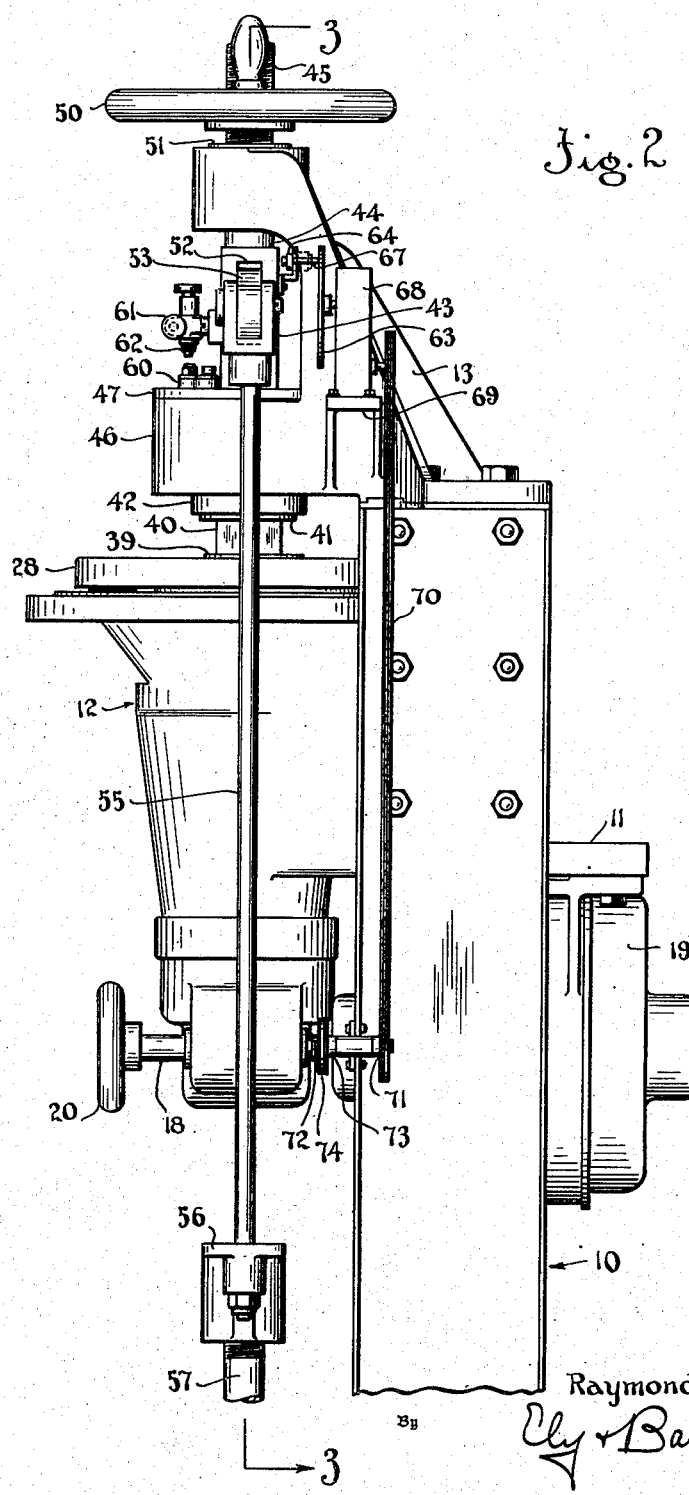

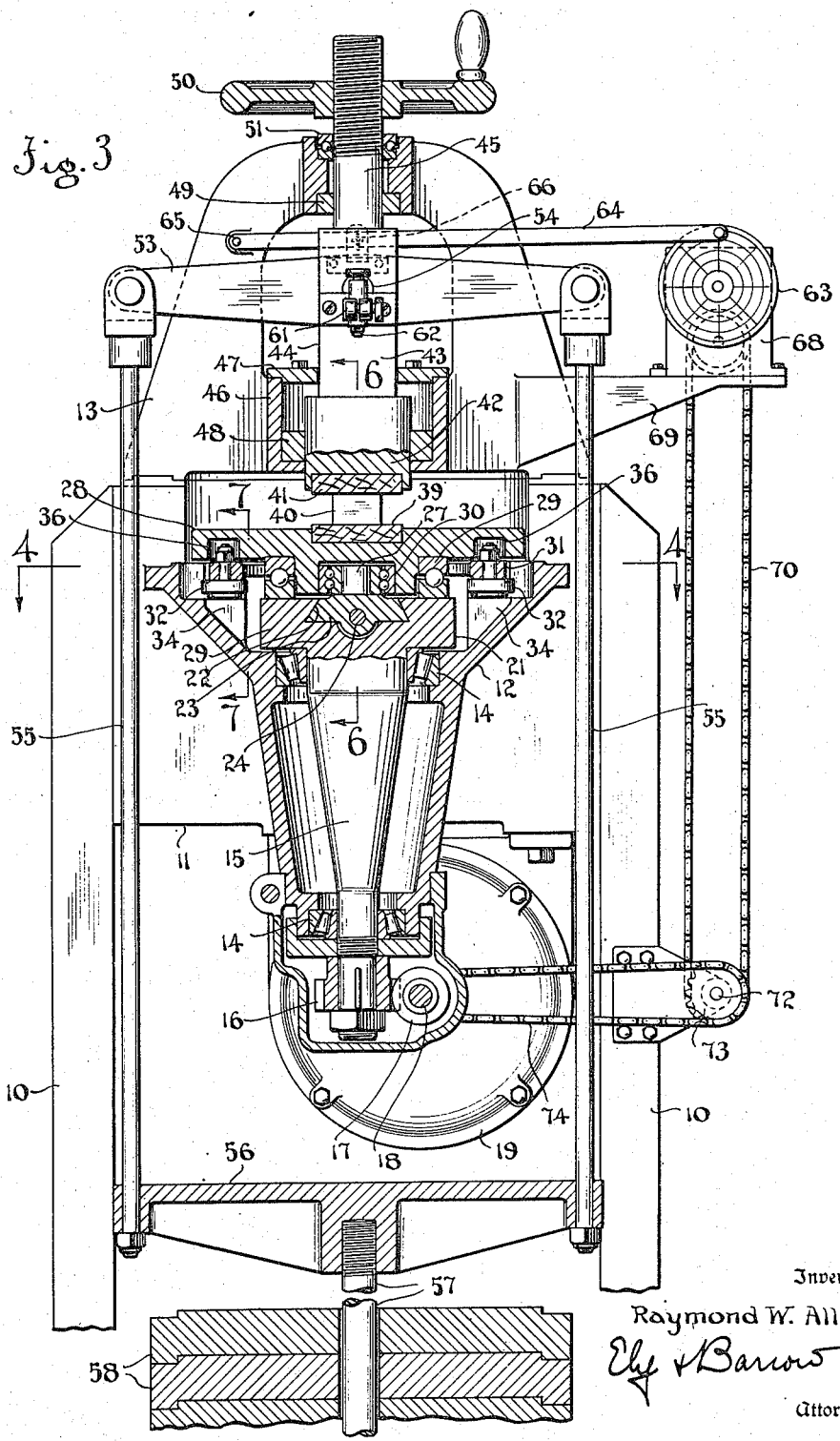

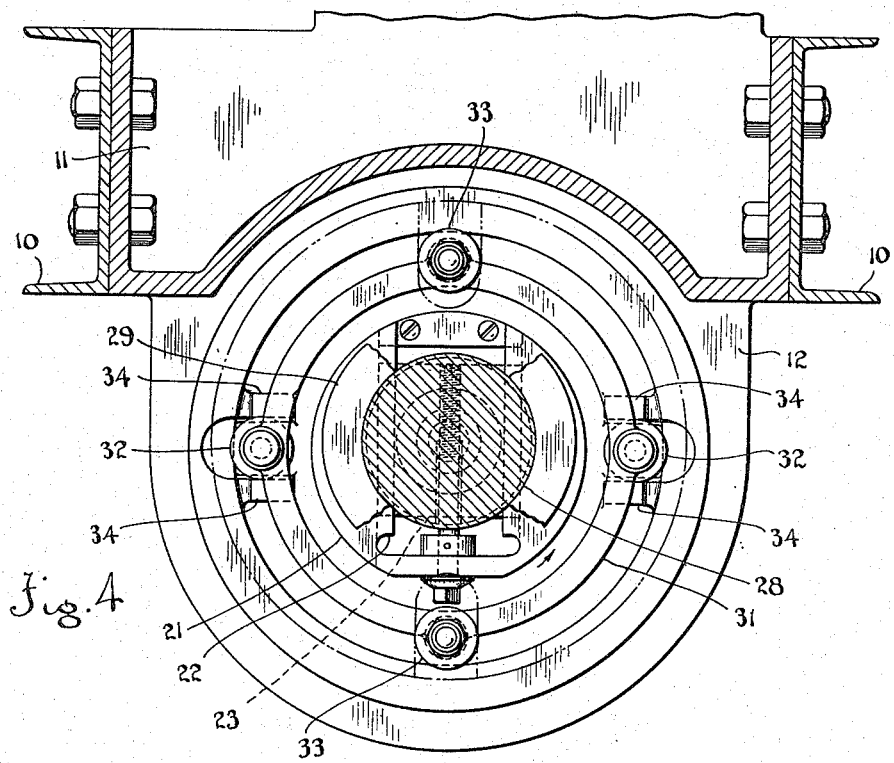
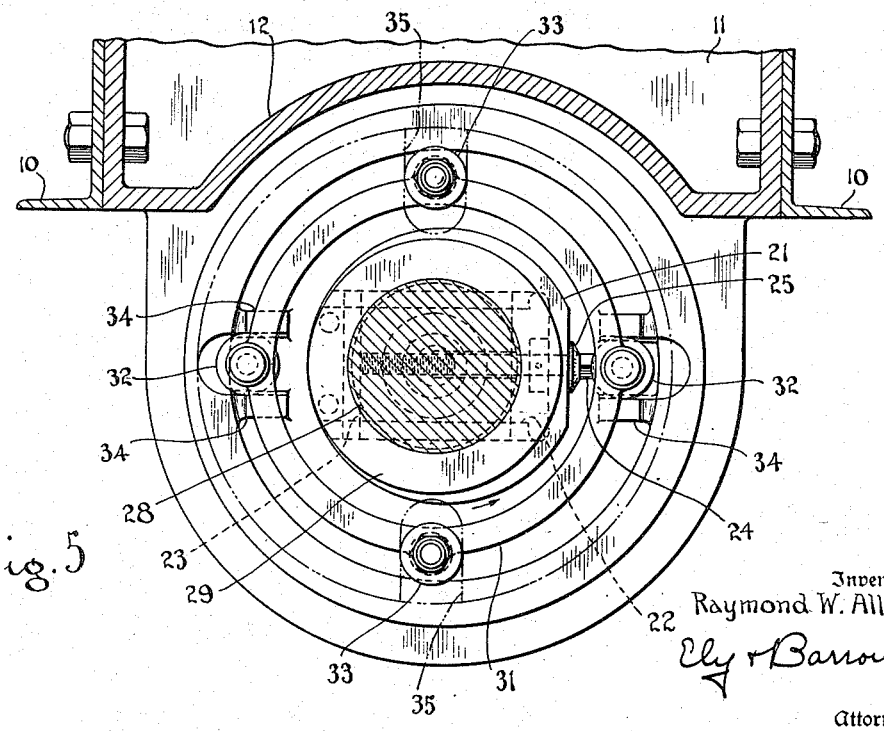

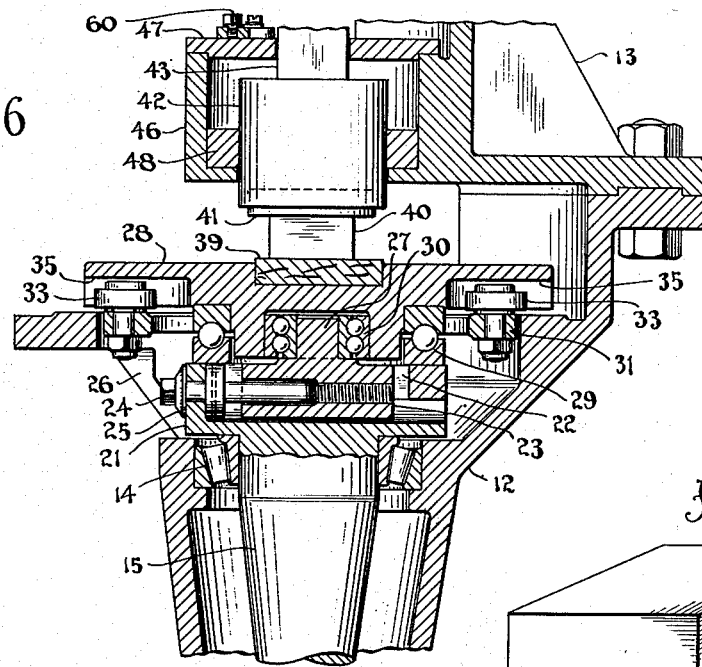
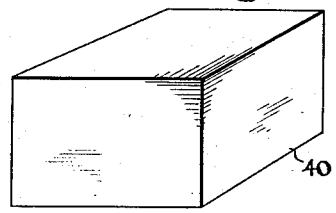
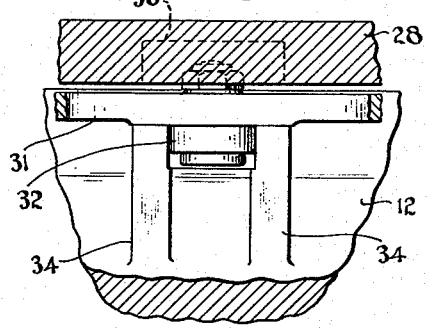
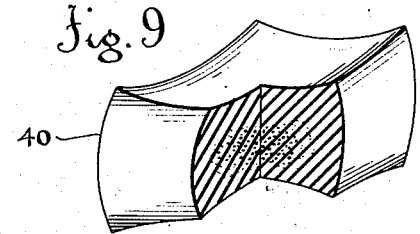
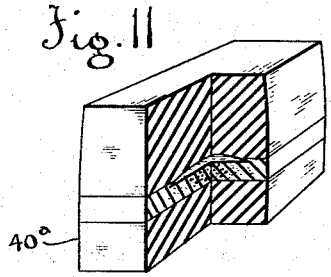
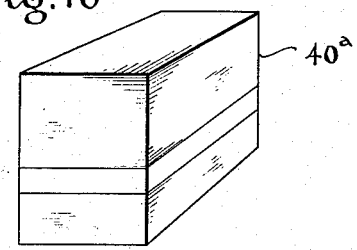

2,048,314

UNITED STATES PATENT OFFICE 2,048,314

APPARATUS FOR TESTING RUBBER

Raymond W. Allen, Akron, Ohio, assignor to The Firestone Tire & Rubber Company, Akron, Ohio, a corporation of Ohio Refiled for abandoned application Serial No. 543,059, June 9, 1931. This application September 29, 1932, Serial No. 635,359

8 Claims. (Cl. 73—51)

This invention relates to testing apparatus for flexing to destruction a test piece of vulcanized rubber composition, and more especially it relates to testing apparatus for applying a flexing action to a rubber test piece while the latter is under compression.

The chief objects of the invention are to provide an improved apparatus for testing rubber samples by flexing the same to determine their flexure breakdown resisting qualities; for testing samples comprising layers of different kinds of rubber to determine the adhesion qualities of the union between the layers; to effect the uniformity of the flexing action by an orbital movement of one surface of the sample with respect to an opposite surface; to apply uniform determinate pressure to the sample during the testing thereof; and to provide a graph depicting the condition of the test piece during the course of the test. This application is a refiling of my prior application Serial No. 543,059 filed June 9, 1931.

Of the accompanying drawings:

Figure 1 is a front elevation of apparatus embodying the invention in its preferred form;
Figure 2 is a side elevation of the upper portion thereof, on a larger scale, as viewed from the right of Figure 1;

Figure 3 is a section on the line 3—3 of Figure 2;

Figure 4 is a section on the line 4—4 of Figure 3;
Figure 5 is a view similar to Figure 4 showing the rotatable member advanced 90 degrees;

Figure 6 is a section on the line 6—6 of Figure 3;

Figure 7 is a section on the line 7—7 of Figure 3;

Figure 8 is a perspective view of a vulcanized rubber test piece before testing;

Figure 9 is a view partly broken away of the same test piece after it has been tested;

Figure 10 is a perspective view of a different type of rubber test piece before testing; and Figure 11 is a view partly broken away of the test piece shown in Figure 10 after it has been tested.

Referring to the drawings, the improved testing apparatus comprises a pair of vertical spaced apart supports or frame members 10, 10, the upper ends of which carry between them a bracket 11 formed with a housing 12, and a bracket-like structure 13 mounted upon the bracket 11. Journaled in suitable thrust bearings 14, 14 within the housing 12 is a vertical spindle 15 upon the lower end portion of which is mounted a worm gear 16 meshed with a worm 17 that is connected to the drive-shaft 18 of a motor 19, the latter being suspended from the under side of the bracket 11. The front end of the shaft 18 extends through the housing 12 and is provided thereat with a hand wheel 20 by which the spindle 15 is manually turned, for a purpose subsequently to be explained.

The top of the spindle 15 is formed with a circular head 21, and the top of the latter is formed with a diametrically disposed slideway 22 in which is mounted a dove-tail slide 23. The respective ends of the slideway 22 are closed, and journaled in the wall of the head at one end of the slideway is a rotatable shaft 24 having its inner end portion threaded into the slide 23, the outer end of the shaft 24, which is disposed exteriorly of the head, being squared to receive a suitable turning tool, and being provided with a calibrated dial 25 to facilitate accurate adjustment of the shaft.

A portion of the housing 12 is cut away at 26 at the front of the apparatus so as to give access to the shaft 24 for adjusting the same, and manual rotation of the spindle 15 is effected by means of the handwheel 20 for bringing the squared end of the shaft 24 opposite the opening 26 of the housing. The arrangement provides conveniently for adjusting the position of the slide 23 radially of the rotatable spindle head 21 from outside the apparatus.

As is most clearly shown in Figures 3 and 6, the slide 23 is formed with an upwardly extending post 27 which moves in an orbit about the axis of the spindle 15 by reason of its eccentric relation to said axis, the diameter of the orbit being controlled by the position of the slide 23 in the spindle head 21. Mounted upon the spindle head 21 is a table 28, a ball bearing structure 29 being interposed between the two, the bearing structure being unconfined upon the said head so as to be bodily movable relatively thereto. The under side of the table 28 is axially recessed to receive the post 27 and a ball bearing structure 30 surrounds said post and engages the wall of the recess. The arrangement is such that orbital movement of the post 27 imparts similar movement to the table 28.

Orbital movement of the table, however, is effected without rotation of the table upon its axis. To this end there is provided a ring 31 upon the under side of which is journaled, at diametrically opposite points, a pair of downwardly projecting rollers 32, 32, and upon the upper side of which is journaled upwardly extending rollers 33, 33, the latter being positioned 90 degrees apart from the rollers 32. The ring 31 is supported upon two pairs of brackets 34, 34 which are formed on the inner wall of the housing 12 near the top and at opposite sides thereof, the brackets of each pair being spaced apart to receive a roller 32 which bears against the adjacent faces of said brackets. The arrangement is such that the ring is capable only of reciprocating movement upon the brackets 34.

The upwardly extending rollers 33 of the ring 31 engage the opposite sides of respective radial slots 35, 35 that are formed in the under surface of the table 28 at opposite sides thereof. The under side of the table also may be formed with annular recesses 36, 36, (Figure 3) to receive the nuts which hold the journals of the rollers 32 in place.

The rollers 33 prevent angular movement of the table 28 upon its axis 27 but permit the table to reciprocate radially with relation to the ring 31, and since the latter is arranged to reciprocate in the direction at right angles thereto, it will be obvious that orbital movement of the post 27 will produce orbital but not rotary movement of the table. A work support consisting of a block of wood 39 is inset into the upper face of the table 28.

The work consists of a block of vulcanized rubber 40 which usually is of square shape as is clearly shown in Figure 8. During the testing operation it is held between the lower work support 39, and a similar overlying work engaging member consisting of a block of wood 41, the latter being urged against the work with determinate pressure to prevent relative movement of the work with relation to the work supports 39, 41, and to assist in breaking down the work being tested.

The upper work-supporting block 41 is inset into the bottom face of a cylindrical head 42 that is formed on the lower end of the square shank 43 of a vertically movable plunger 44, the upper end of the plunger consisting of a stem 45 that is threaded on its end portion. The head 42 and adjacent portion of the shank 43 of the plunger are enclosed in a bearing housing 46 that is formed upon the bracket structure 13, the head 42 extending through the bottom of the housing, and the shank 43 extending through a square aperture in a cover 47 on the top thereof, whereby angular rotative movement of the plunger is restrained. A suitable bearing bushing 48 is mounted in the housing 46 engaging the head 42.

The stem 45 of the plunger 44 extends through a bearing bushing 49 mounted in the upper part of the bracket structure 13, and the threaded portion of the stem has mounted thereon a handwheel 50 by means of which the plunger 44 may be manually raised or lowered, there being a ball bearing 51 mounted in the top of the bracket structure upon which the hub of the hand-wheel bears during the plunger-lifting operation.

For imparting determinate downward pressure to the plunger 44, the square shank 43 thereof is transversely apertured at 52, Figure 2, to receive a beam 53, the latter being pivotally supported upon a pivot pin 54 extending through the shank. Suspended from the respective ends of the beam 53 are rods 55, 55, the lower ends of which are connected by a yoke 56, that carries a depending rod 57 upon which is mounted a plurality of weights 58, 58.

In order to give audible evidence of the completion of a test, a warning signal such as an electric bell or buzzer (not shown) is provided. The bell or buzzer is electrically connected to a switch that is mounted upon the testing apparatus, a stationary contact member 60 of the switch being mounted upon the cover plate 47 of the bearing housing 46 and a movable member 61 of the switch being mounted upon the shank 43 of the plunger 44. The movable switch member 61 comprises a vertically adjustable contact 62 by means of which the switch may be arranged so as to close and operate the warning signal at different elevations of the plunger 44.

In order to record graphically the progress of the failure of a test piece during the testing thereof, a rotatable chart 63 is provided, and an arm 64 which is pivotally mounted upon the bracket structure 13 at 65, and has its intermediate portion suitably connected at 66 to the plunger 44, has its free end provided with an inked pen 67, (Figure 2), that bears against the chart 63. The chart 63 is supported and rotated by a reduction gear device 68 that is mounted upon a laterally extending bracket 69 on the bracket structure 13. The reduction gear device 68 is driven by a sprocket chain 70 connected to a sprocket 71 on a countershaft 72, and a sprocket 73 on the latter is connected by a sprocket chain 74 with a suitable sprocket (not shown) on the drive shaft 18 of the motor 19.

*Operation.*—In the inoperative position of the apparatus, the motor 19 is motionless and the plunger 44 is supported in elevated position by the handwheel 50. In this position of the plunger the work supports 39, 41 are spaced apart sufficiently to permit the mounting therebetween of a test piece 40. The plunger 44 is then lowered so that the member 41 engages the test piece, and the latter supports the plunger and the weights 58 suspended therefrom. The handwheel is threaded upwardly on the stem 45 a sufficient distance to permit subsequent unrestricted downward movement of the plunger during the test.

The motor 19 is then set in motion to rotate the chart 63, and to rotate the spindle 15 whereby orbital movement is imparted to the table 28 and work support 39. Since the weight of the plunger 44 and the weights 58 provide sufficient friction to prevent movement of the work 40 with relation to the work supports 39, 41, it will be seen that orbital movement of the lower work support about the axis of the upper work support will apply a kneading or flexing action to the interposed test piece. As the test proceeds the internal friction in the test piece generates sufficient heat to gradually lessen the resilience and rigidity of the rubber until the interior thereof becomes substantially plastic, and thus permits the plunger gradually to move downwardly.

At the conclusion of the test the test piece rapidly breaks down and allows the plunger to descend quickly to a point where the electrical contact 62 engages the electrical contact 60 and thus automatically actuates the warning signal announcing the termination of the test. When removed from the apparatus and cooled the test piece presents substantially the appearance shown in Figure 9, its sides being bulged, its thickness being diminished, and its interior being porous.

The apparatus is also applicable to a test of the adhesion properties of two different kinds of rubber vulcanized together. For this purpose a test specimen 40ª as shown in Figure 10 is placed in the apparatus and the procedure carried out similarly to the testing of test piece 40 above described. Test piece 40ª is formed by vulcanizing two different kinds of rubber together forming a union substantially in a plane parallel to the planes of the faces to be engaged by the work supports 39 and 41. One type of rubber may be vulcanized in the sample separating two layers of the other type of rubber as shown in Figure 10. If desired, however, the two kinds of rubber may be vulcanized together in two layers only (not shown). The orbital movement of the upper surface with respect to the lower surface while the specimen is held under compression results in a breaking down of the union between the two different kinds of rubber as shown in Figure 11. Comparative results will indicate which types of rubber possess the greatest adhering properties. This type of test is especially valuable in determining the adhesion properties of cushion gum and tread stock as vulcanized together in the tread of a pneumatic tire. The test is also useful in determining the degree of adhesion of a veneer solid tire construction, where the body of the tire is composed of a heat transmitting, blow-out resisting type of rubber and is covered by a veneer of tough abrasion resisting rubber.

The apparatus is substantially automatic in its operation, and provides an excellent simulation of the treatment to which the rubber of solid and pneumatic tires is subjected under service.

The apparatus may be modified within the scope of the appended claims which are not limited wholly to the specific construction shown and described.

What is claimed is:

1. Rubber testing apparatus comprising opposed work engaging members adapted frictionally to engage opposed surfaces of an interposed rubber test piece, means for compressing said test piece between its frictionally engaged surfaces, means for effecting orbital movement of one of said opposed surfaces with respect to the other, and means for preventing relative rotation of said opposed work engaging members.

2. Testing apparatus comprising opposed work engaging members adapted to support an interposed test piece of resilient material, means for effecting relative orbital movement of said members, and means for preventing relative movement between the surfaces of said test piece and the respective work engaging members and for exerting uniform pressure upon the test piece throughout a test.

3. Testing apparatus comprising opposed work engaging members adapted frictionally to engage an interposed test piece of resilient material, means for effecting orbital movement of one of said members about the axis of the other member, and means for urging said members toward each other to grip the test piece and prevent relative movement between the work engaging members and the surfaces of the test piece in engagement therewith.

4. In testing apparatus the combination of a table, a driving spindle, a pivotal connection between the table and spindle, said connection being eccentrically disposed with relation to the axis of the spindle whereby rotation of the spindle produces orbital movement of the table, means for preventing angular rotary movement of said table during the orbital movement thereof, and means for holding a test piece in engagement with the top of the table.

5. In testing apparatus, the combination of a table, a driving spindle, a pivotal connection between the table and spindle, means for adjusting the said pivotal connection eccentrically of the axis of the spindle whereby rotation of the latter will cause orbital movement of the table, and means for urging a test piece of resilient material against the top of the table.

6. In testing apparatus, the combination of a table, a driving spindle, a pivotal connection between the table and the spindle, means for adjusting the said pivotal connection eccentrically of the axis of the spindle whereby rotation of the latter causes orbital movement of the table, means for preventing rotary movement of the table during the orbital movement thereof, and means for urging a test piece of resilient material against the top of the table.

7. A combination as defined in claim 6 in which the means for preventing rotary movement of the table comprises a non-rotatable ring engaging the table and movable relatively thereof in one direction, and movable relatively of the spindle in a transverse direction.

8. A combination as defined in claim 6 in which the apparatus comprises a support for said spindle, said support being provided with fixed guides extending radially of said spindle, said table being provided with radial grooves, and said means for preventing rotary movement of the table comprising a non-rotatable ring, oppositely disposed downwardly extending rollers thereon engaging said fixed guides so as to permit reciprocating lateral movement of the ring in one direction, and upwardly extending rollers on the ring spaced 90 degrees from the downwardly extending rollers engaging said radial grooves in the table so as to permit reciprocating lateral movement of the table with relation to the ring.

RAYMOND W. ALLEN.